United States Patent
Van Gestel

(10) Patent No.: US 8,548,301 B2
(45) Date of Patent: *Oct. 1, 2013

(54) RECORD CARRIER CARRYING A VIDEO SIGNAL AND AT LEAST ONE ADDITIONAL INFORMATION SIGNAL

(75) Inventor: Wilhelmus Jacobus Van Gestel, Heeze (NL)

(73) Assignee: Koninklijke Philips N.V., Eindhoven (NL)

( * ) Notice: Subject to any disclaimer, the term of this patent is extended or adjusted under 35 U.S.C. 154(b) by 749 days.

This patent is subject to a terminal disclaimer.

(21) Appl. No.: 12/758,392

(22) Filed: Apr. 12, 2010

(65) Prior Publication Data

US 2010/0239231 A1    Sep. 23, 2010

Related U.S. Application Data

(63) Continuation of application No. 10/570,214, filed on Feb. 28, 2006, now Pat. No. 7,725,006.

(30) Foreign Application Priority Data

Sep. 4, 2003    (EP) ..................................... 03103285

(51) Int. Cl.
*H04N 5/92*    (2006.01)
*H04N 5/7824*    (2006.01)

(52) U.S. Cl.
USPC .......................................... 386/248; 386/318

(58) Field of Classification Search
USPC ................. 386/248, 318, 321, 323, 324, 337, 386/338, 339
See application file for complete search history.

(56) References Cited

U.S. PATENT DOCUMENTS

| | | | |
|---|---|---|---|
| 4,777,537 A | 10/1988 | Ueno et al. | |
| 5,497,241 A | 3/1996 | Ostrover et al. | |
| 5,583,652 A * | 12/1996 | Ware | 386/206 |
| 5,765,105 A | 6/1998 | Kuriki | |
| 5,889,564 A | 3/1999 | Tsukagoshi | |
| 5,924,041 A | 7/1999 | Alperovich et al. | |
| 5,949,752 A | 9/1999 | Glynn et al. | |

(Continued)

FOREIGN PATENT DOCUMENTS

| | | |
|---|---|---|
| EP | 0798722 A | 10/1997 |
| EP | 0868087 A | 9/1998 |

(Continued)

OTHER PUBLICATIONS

3rd Generation Partnership Project TSG SA WG3 Security—S3#28, May 2003.

(Continued)

*Primary Examiner* — Robert Chevalier

(57) ABSTRACT

A record carrier is described carrying a video signal and at least one additional information signal, such as graphics or audio. The at least one additional information signal is meant to be reproduced simultaneously with said video signal. The record carrier further carries scheduling information indicating in which order parts of the at least one additional information signal or video signal have to be read from said record carrier. The scheduling information enables a reproducing device according to the invention to read parts of the video signal and the additional information signals such that no buffer overflow or underflow occurs. The size of the buffers in the apparatus can be reduced by means of the scheduling information.

20 Claims, 3 Drawing Sheets

(56) References Cited

U.S. PATENT DOCUMENTS

Figure 4:
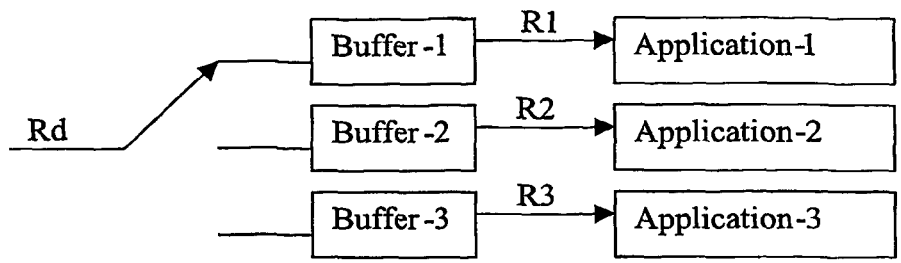

| | | |
|---|---|---|
| 5,966,182 A | 10/1999 | Yonemitsu et al. |
| 6,092,133 A | 7/2000 | Erola et al. |
| 6,128,434 A | 10/2000 | Hirayama et al. |
| 6,392,968 B1 | 5/2002 | Kageyama et al. |
| 7,545,897 B2 | 6/2009 | Yoo et al. |
| 2001/0226561 | 10/2001 | Morris et al. |

FOREIGN PATENT DOCUMENTS

| | | | |
|---|---|---|---|
| EP | 0917143 A | | 5/1999 |
| EP | 1257106 A1 | | 11/2002 |
| WO | 0124533 A | | 4/2001 |
| WO | 0145400 A1 | | 6/2001 |
| WO | 0148756 A1 | | 7/2001 |
| WO | 0251132 | | 6/2002 |

OTHER PUBLICATIONS

3GPP TSG SA WG3 Security—S3#18, May 2001, UE Split Over Several Devices.

ISR, The Written Opinion of the International Searching Authority, Jan. 2004.

ISR Publication, International Publication No. WO2005/024824A1, Mar. 17, 2005.

* cited by examiner

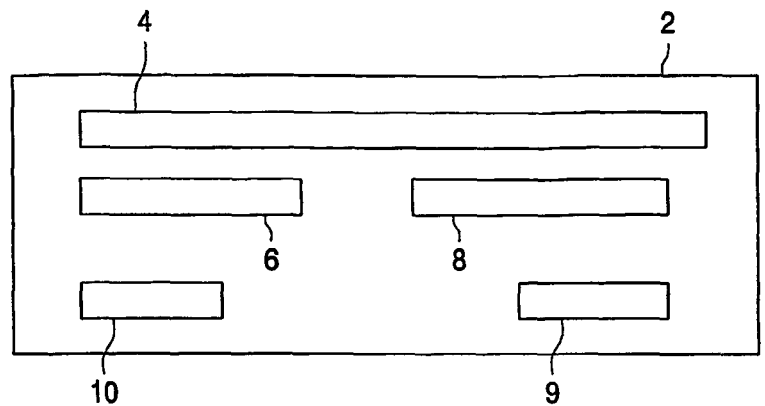
FIG. 1
| STC | File | Start Addr | Length |
|---|---|---|---|
| $T_1$ | a | 100 | 30 |
| $T_2$ | b | 5 | 20 |
| $T_3$ | b | 37 | 16 |
| ⋮ | ⋮ | ⋮ | ⋮ |
| $T_{end}$ | | | |
FIG. 2
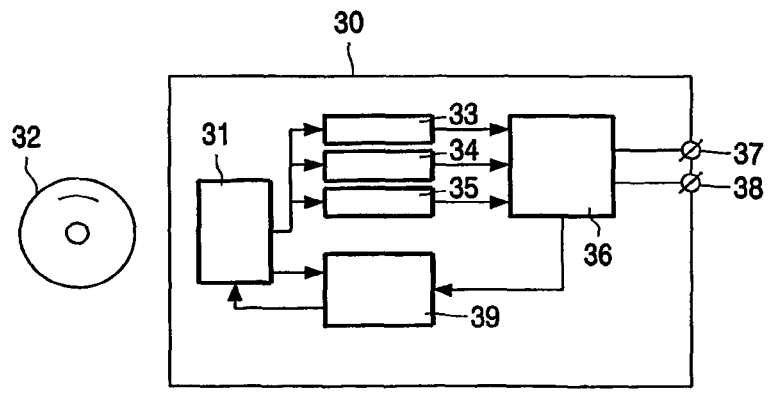
FIG. 3

RECORD CARRIER CARRYING A VIDEO SIGNAL AND AT LEAST ONE ADDITIONAL INFORMATION SIGNAL

This is a continuation of prior application U.S. Ser. No. 10/570,214, filed Feb. 28, 2006 now U.S. Pat. No. 7,725,006 and is incorporated by reference herein.

The invention relates to record carrier carrying a video signal and at least one additional information signal, the at least one additional information signal being meant for being reproduced simultaneously with said video signal. The invention further relates to an apparatus for reproducing a video signal and at least one additional information signal recorded on such a record carrier, the apparatus comprising:

reading means for reading parts of the video signal and the at least one additional information signal from said record carrier for supplying said signals to corresponding buffering means;

first buffer means for buffering the parts of the video signal read from the record carrier;

second buffer means for buffering the parts of the at least one additional information signal read from the record carrier;

signal processing means for processing the parts of said video signal and parts of the at least one additional information signal supplied by first and second buffer means, respectively, so as to obtain at least one output signal.

The invention further relates to a method of recording a video signal and at least one additional information signal on a record carrier, the at least one additional information signal being meant for being reproduced simultaneously with said video signal.

A record carrier and apparatus as defined above are commonly known, for example discs according to the DVD standard and a DVD player. In the current systems all the elementary streams are multiplexed in the Main multiplex. This has the advantage that they are read at the right moment and that the buffering can be minimized. However, the total bit rate of the main multiplex stream becomes high. For example, if a disc supports auxiliary audio and subtitles for different languages, an additional elementary streams have to be added to the main multiplex for all the supported auxiliary audio and subtitles. During reproduction the entire main multiplex is read from the disc and only the selected additional streams are used for simultaneous reproduction with the video signal. The apparatus should be capable of reading the main multiplex having the high bit rate. The reading means of such apparatuses must have a greater bandwidth than the bandwidth needed to read only the video stream and requested elementary streams. Furthermore, the main stream has to be re-multiplexed during the authoring process, this is the process in which the additional information signals are added to the main stream. This is a complicated operation, which could have an impact on the video signal, as the video signal has to be processed. Furthermore, auxiliary audio and subtitles are made for specific regions. So prior to making a record carrier with one main multiplex, all elementary streams have to be available, as it is not possible to add an additional information signal after the main multiplex has been generated.

It is an object of the invention to provide a recording medium carrying a video signal and at least one additional information signal that can be composed more easily. Furthermore, it is an object of the invention to provide a reproducing apparatus which reduces the required bandwidth of the reading means to be able to read from the record carrier both the video signal and required additional information signal.

The record carrier in accordance with the invention is characterized in that the record carrier further carries scheduling information indicating in which order parts of the at least one additional information signal or video signal have to be read from said record carrier.

An apparatus for reproducing a video signal and at least one additional information signal in accordance with the invention is characterized in that the reading means are further adapted to read scheduling information from said record carrier, the scheduling information indicating in which order parts of the at least one additional information signal or video signal have to be read from said record carrier, and the apparatus further comprises scheduling means for controlling the reading means so as to read parts of the at least one information signal or video signal and to supply the parts read to the corresponding buffering means in dependence on the scheduling information.

The invention is based on the following recognition. Normally, film makers make a film in one language. The video signal is normally an MPEG signal. However, the video signal could be any signal that can be visually represented, such as graphics, a picture, a moving picture, an image, or an icon. Additional languages and/or subtitles are added by means of authoring tools. Preferably, the received video signal is recorded unaltered on the record carrier. If the video signal has to be altered, this may introduce errors in the MPEG signal. Therefore, the additional signals are stored separately from the original video signal, i.e. in different files or streams. During reproduction both the video signal and the additional signal have to be reproduced simultaneously and synchronously. If at least either the video signal or the additional information signal has a variable bit rate, or both, the apparatus has to know when parts of the video signal and additional signal have to be read from the record carrier so as to avoid a buffer underflow or overflow in the decoding buffers. However, the order in which the parts have to be read is not fixed. It is important that there is no buffer underflow or overflow. As the video signal and the additional signal are placed in different locations, jumps of the reading means are needed to read subsequent parts of the video signal and the additional information signal. Some time intervals during reproduction are more suited to jumps than others. Suitable time intervals have, for example, a low bit rate or are situated just before the reading of an extent of the data from one of the signals or files. Furthermore, the physical locations of the parts with respect to each other have to be taken into account as this determines the time needed to move the reading means from the end location of one part to be read to the start location of the subsequent part to be read. All these characteristics are known during authoring of the disc, as at that moment the layout of the disc is made. The authoring tools are able to determine in which order parts of the video signal and the additional information signal have to be read from the record carrier so as to avoid both a buffer underflow and overflow. Normally a buffer overflow is avoided by postponing the reading of a part of a signal until there is enough space available in the buffer for storing the part to be read. However, the fullness of the other buffers is not monitored during waiting. It will take a long time before enough space is available to store a next part of the signal in the buffer if a signal with a very low bitrate is present in the buffer currently being monitored. One of the other buffers could become empty during waiting, for example as one of the other signals has a high bitrate. This will result in a buffer underflow for the signal with the high bitrate.

According to the invention, scheduling information is available on the record carrier. The scheduling information indicates in which order parts of the respective files or signals have to be read from the record carrier. By taking at least into account the bitrate and location of the signals on the record carrier, such scheduling information can be made available during recording of the record carrier or editing of the video signal. Some examples of editing are audio dubbing or combining the video signal with sub-play items. The scheduling information can be generated during editing. After editing, the scheduling information is recorded on the record carrier. It is very easy to add the scheduling information to the main video signal and the additional signals just by writing an additional file comprising the scheduling information on the record carrier because the scheduling information can be generated at any time if the information of the additional information signals is available and can be added without altering the main video signal.

Only the video signal and a selection of the additional information signals have to be read from the record carrier during reproduction, so the bandwidth of the reading unit can be less than if the video signal is in a multiplex signal which comprises all the additional information signals. Obviously, a reading unit with less bandwidth requirement can be cheaper. Furthermore, the use of the scheduling information makes the scheduling very easy as the instants at which information has to be read are determined by the information in the scheduling information and do not have to be determined continuously by the apparatus through measurement of the degree of filling of the respective buffers.

Figure 5A:
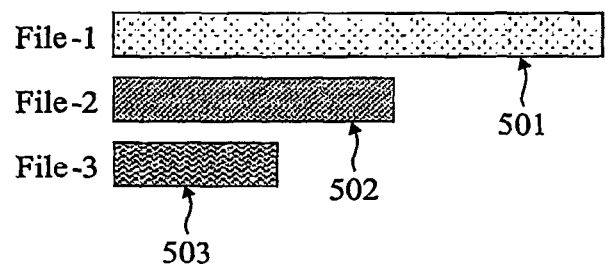
Figure 5B:
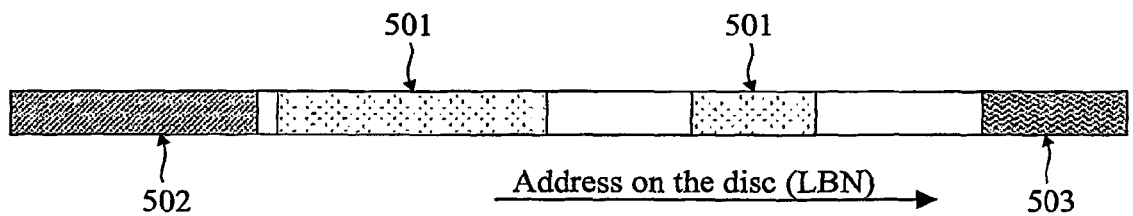
Figure 6:
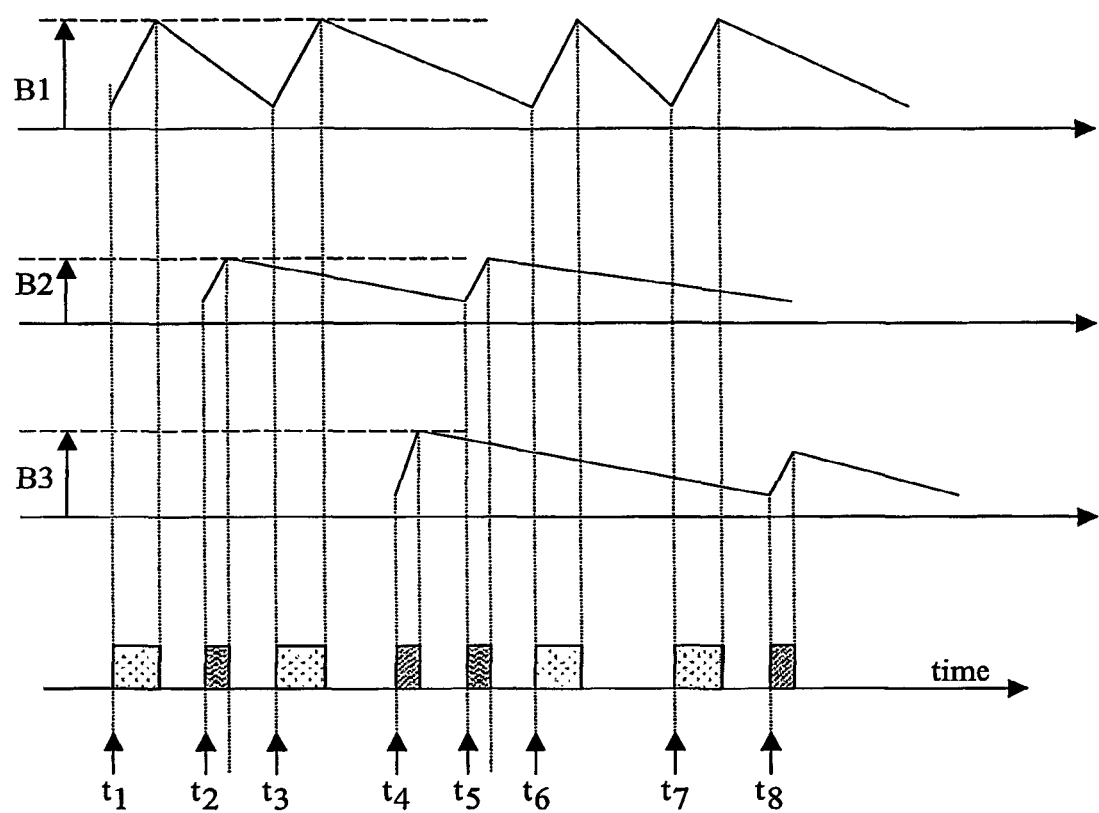

These and other aspects of the invention will be apparent from and elucidated by means of embodiments with reference to the drawings in which FIG. 1 shows an embodiment of a record carrier in accordance with the invention, FIG. 2 shows an embodiment of a Table comprising scheduling information, FIG. 3 shows an reproducing apparatus in accordance with the invention, FIG. 4 schematically shows the functioning of the apparatus, FIGS. 5*a* and 5*b* show schematically three files and the corresponding locations on a record carrier, FIG. 6 shows an example of the degree of filling of three buffers and the corresponding scheduling of the read process.

FIG. 1 schematically shows a first embodiment of a record carrier 2 in accordance with the invention. The record carrier is preferably in the form of an optical disc. However, a solid-state memory or flash memory could also be used if the memory capacity is enough to store all the necessary information. A stream file 4 is stored on the record carrier. The stream file comprises the Video/Audio of the main stream and the scheduling information 10. Furthermore, at least one of the following files are written on the record carrier: Aux-Audio file 6 containing audio in one other language, a subtitle file 8 containing the subtitles for another language, and a still picture 9 file containing pictures for menus or pictures to be combined with the video signal, for example by overlaying. The files are split into file extents. Each file extent is contiguously written in the addressing space of the record carrier. The file extents of a file are distributed in the logical volume of the record carrier. It is not necessary that the file extents of one file are written contiguously on the record carrier.

The scheduling information is stored in separate files on the record carrier. A specific file will be stored for each combination of video and additional information signal. For example, if the producer of the disc offers the possibility the see the original video signal spoken in English with optional audio in Dutch and German, a scheduling information file has to be available for the combination of video and Dutch as well as a scheduling information file for the combination of video and German. The same has to be done if subtitles in different languages are offered.

The scheduling information may be in the form of a Table. FIG. 2 shows an embodiment of such a Table comprising scheduling information. Each entry in the Table comprises a field 12 indicating at what time a part of a file or file extent has to be read. The time value in said time field is derived from the System Time Clock (STC) of the MPEG Multiplex stream. Furthermore, an entry comprises a field 14 indicating which file or file extent has to be read and a field 16 indicating the start address of the part to be read. The start address may be an address in a file, normally the byte number in a file, or the physical start address on the record carrier, normally represented as a logical block number. If the parts to be read do not have a fixed size, each entry comprises a field 18 indicating the amount of data to be read. The amount may be the number of logical blocks to be read or the number of bytes.

An apparatus 30 in accordance to the invention is shown in FIG. 3. The apparatus comprises a reading unit 31 for reading the video signal, scheduling information, and the additional information signals from a record carrier 32. The record carrier is an optical disc in the embodiment. The video signal is in the form of an MPEG transport stream. Such a transport stream comprises a video signal and a corresponding audio signal. Additional information signals may be ASCII files, MPEG-2 audio files, or JPEG-files. An ASCII file comprises the subtitling in a specific language. An ASCII file is written on the record carrier for each language. A MPEG-2 audio file comprises an audio stream for a specific language. The JPEG-file contains sub-pictures for combining with the video signal.

The video signal and additional signals read are supplied to the respective buffers 33, 34, 35. The buffers perform a first in first out function. The outputs of the buffers are connected to a processing unit 36. The processing unit is adapted to reproduce the signals supplied by the buffers simultaneously so as to obtain a video signal and an audio signal, and possibly other signals, for example to control the ambience of the user. The video and audio signals are supplied to the respective outputs 37, 38.

The apparatus further comprises a scheduling unit 39. The scheduling unit is adapted to retrieve the scheduling information and to control the reading unit 31. The scheduling unit has an input for retrieving time information from the main video stream in order to be able to determine the time when a part of the signals has to be read. The scheduling unit performs the following function. First it retrieves the scheduling information. The scheduling information is preferably in the form of a Table. Then it retrieves the first entry of the Table. This entry indicates when and from which file a part has to be read. Furthermore, the entry indicates where in the file or where physically on the disc the part is located and what amount of data has to be read. The apparatus retrieves the system time clock from the main multiplex stream in order to determine the time that a new part has to be read. The scheduling unit compares the system time clock with the time retrieved from the entry read. As soon as the system time clock has a time which is later than the entry time, the scheduling unit instructs the reading unit to read a part of the signal of said entry starting at the position indicated in the start address field and to read the amount indicated in the amount field. Then the scheduling unit retrieves the next entry from the table and waits with instructing the reading unit to read a next part until the system clock time in the video signal is later than the time in field of the current entry again.

The scheduling information may also be stored in a file system Table. In this case the scheduling takes place in the File System layer. The Table is at the beginning read by the Operating system during the start of a Play List. Each entry of the Table contains a first field indicating from which file data has to be read, a second field indicating the logical block in the file at which the reading has to start, and a third field indicating the number of logical blocks that have to be read starting from the logical block indicated by the second field. The scheduling unit is now arranged to execute a new entry when the previous entry has been finalized. When an entry is retrieved from the Table, the scheduling unit monitors the free space in the buffer corresponding to the file to be read. As soon as the free space is larger than the amount of data to be read by this entry, the scheduling unit instructs the reading unit to read the part from the record carrier.

The scheduling information may be generated by the following method. This method may be performed during authoring of a disc as at that time the layout of the disc is made. First the video signal in the form of an MPEG transport stream is retrieved. Then the additional information signals, which have to be reproduced simultaneously with the video signal, are retrieved. The bitrate in time is determined from both the video signal and the additional information signal. The signals are divided into parts in dependence on the bitrate. Then, for each part of the video signal and the additional information signal, the moment at which said part should be available at the latest in a corresponding buffer in a reproducing apparatus is determined so as to avoid a buffer underflow when reproducing the video signal and the at least one additional information signal simultaneously. To optimize the scheduling further, the location on the disc of the subsequent part to be read may be taken into account. The relatively slow movements of the optical pickup unit may be a reason for buffer underflow. An entry in the table of scheduling information is generated for each part to be read. An entry comprises at least the file to be read, a reference to the starting address, and the size of the part to be read. After the scheduling information has been made, the MPEG transport stream, the additional signals, and the scheduling information are written on the record carrier.

FIG. 4 schematically shows the functioning of the apparatus. The reading unit 31 reads data from the disc with a specific playback rate Rd. The data is supplied to the corresponding buffer at said rate Rd. The buffer is defined by the entry in the Table that initiated the current read action. In FIG. 4 the data is supplied to Buffer 1. Each buffer has a corresponding leak rate. The leak rates of buffer 1, buffer 2, and buffer 3 are denoted R1, R2, and R3, respectively. The leak rate of each buffer depends on the data needed by the corresponding application. It should be noted that the processing unit 36 in FIG. 3 processes the three applications shown in FIG. 4 simultaneously. This processing may be entirely in software. Alternatively, however, an application may be processed by a specific piece of hardware, for example video on a video processor, audio on an audio processor, and graphics on a specific graphics processor.

FIG. 5a schematically shows three Files. Each file has a specific size in bytes. The byte at the beginning of the file normally has address number 0 and the last byte in a file has an address that corresponds to the file size −1. In this way address number X−1 refers to the $X^{th}$ byte in a file. FIG. 5b schematically shows three files and the corresponding locations on a record carrier. A file may be contiguous on the record carrier. In FIG. 5b, File-2 denoted 502 and File-3 denoted 503 are contiguous on the record carrier. File-1 is split into two contiguous parts on the record carrier. An address on the record carrier refers to a logical block number (LBN) on the disc. A logical block comprises a fixed number of bytes. Normally the logical block with number 0 is at the inner side of the disc. Furthermore, the logical blocks are numbered in ascending order.

FIG. 6 shows an example of the degree of filling of three buffers and the corresponding scheduling of the read process. At a first time $t_1$, an entry from the scheduling table is executed. According to this entry, the reading unit is instructed to read a part of data from File-1 and to supply the part of data to Buffer-1. The Buffer-1 will be filled at a rate that corresponds to the playback rate Rd minus the leak rate from Buffer-1 R1. Simultaneously, data from the other buffers is supplied to the corresponding application. At a second time $t_2$, a subsequent entry from the scheduling table is executed. According to this entry, the reading unit is instructed to read a part of data from File-2 and to supply the part of data to Buffer-2. The Buffer-2 will be filled at a rate that corresponds to the playback rate Rd minus the leak rate from Buffer-2 R2. Simultaneously, data from the other buffers is supplied to the corresponding application. At a third time $t_3$, the subsequent entry from the scheduling table is executed. According to this entry, the reading unit is instructed to read a part of data from File-1 and to supply the part of data to Buffer-1. The Buffer-1 will be filled at a rate that corresponds to the playback rate Rd minus the leak rate from Buffer-1 R1. Simultaneously, data from the other buffers is supplied to the corresponding application. At a fourth time $t_4$, again, a subsequent entry from the scheduling table is executed. According to this entry, the reading unit is instructed to read a part of data from File-3 and to supply the part of data to Buffer-3. The Buffer-3 will be filled at a rate that corresponds to the playback rate Rd minus the leak rate from Buffer-3 R3. Simultaneously, data from the other buffers is supplied to the corresponding application. It should be noted that jumping from one location to another on the record carrier takes time, during which no data is read from the record carrier. In the meantime, data is supplied from the buffers to the corresponding applications. Therefore, the playback rate from the record carrier Rd should be higher then the sum of the average leak rates of the buffers. The scheduling is carried out such that an underflow or overflow will never occur in any of the buffers. In the presented example, the size of the parts of data to be read of a file is fixed for every file. For File_1, this size is greater than the size for a part to be read of File_2 or File_3. This size may, however, be variable for a specific file, which makes it possible to have further reduced buffers without having under and overflow.

Though the invention was described above with reference to preferred embodiments thereof, it is to be understood that these are non-limitative examples. Thus, various modifications are conceivable to those skilled in the art without departing from the scope of the invention as defined by the claims. The video signal is a sequence of images in the embodiments described. However, the video signal used in the embodiments may be any signal that can be visually represented, such as graphics, a picture, a moving picture, an image, or an icon. The video signal and the additional information signals may be stored on separate discs, for example a first disc carrying the video signal and the scheduling information and a second disc carrying the additional information signals. In that case the apparatus should be adapted to read from two discs in parallel. A disc changer could also do this. In that case the apparatus should know on which of the discs each of the respective files is stored. This information may be stored in the field indicating the file to be read. The second disc may also be an hard disk. In this embodiment the additional information files are first copied from a disc or the Internet onto the hard disk. When the files are all present, the reproduction of the video signal can be started.

The use of the verb "to comprise" and its conjugations does not exclude the presence of elements or steps other than those stated in a claim. Furthermore, the use of the article "a" or "an" preceding an element does not exclude the presence of a plurality of such elements. In the claims, any reference signs placed between parentheses shall not be construed as limiting the scope of the claims. The invention may be implemented by means of hardware as well as software. Several "means" may be represented by the same item of hardware. If the invention is implemented as software, the corresponding program may be stored on a record carrier so as to enable a device to execute the program and to perform the method according to the invention. Furthermore, the invention resides in each and every novel feature or combination of features.

The invention claimed is:

1. A record carrier storing a video signal and at least one additional information signal, the at least one additional information signal being meant for being reproduced simultaneously with said video signal, wherein the record carrier further stores scheduling information comprising time values indicating at what time parts of the at least one additional information signal or the video signal has to be read from said record carrier, wherein parts of the at least one additional information signal or the video signal are to be read from said record carrier when a system time clock is later than a time value starting at a position indicated in a start address field included in the scheduling information.

2. The record carrier as claimed in claim 1, wherein the scheduling information is in the form of a table comprising entries, and each entry of the table comprises a first parameter indicating a start position of the part to be read.

3. The record carrier as claimed in claim 2, wherein each entry further comprises a second parameter indicating an amount of data to be read.

4. The record carrier as claimed in claim 3, further comprising a file system, wherein the scheduling information is part of file system information of the file system.

5. The record carrier as claimed in claim 4, wherein the first parameter refers to a logical block on the record carrier.

6. The record carrier as claimed in claim 5, wherein the second parameter relates to a number of logical blocks to be read.

7. The record carrier as claimed in claim 3, wherein the video signal, the at least one additional information signal, and the scheduling information are stored in separate files on said record carrier, and wherein the first parameter refers to a relative position in a corresponding file to be read.

8. The record carrier as claimed in claim 7, wherein the second parameter relates to a number of bytes to be read from the corresponding file.

9. An apparatus for reproducing a video signal and at least one additional information signal recorded on a record carrier, the apparatus comprising:
a reader configure to read parts of the video signal and the at least one additional information signal from said record carrier for supplying the video signal to a first buffer and the at least one additional information signal to a second buffer;
the first buffer being configured to buffer the parts of the video signal read from the record carrier;
the second buffer being configured to buffer the parts of the at least one additional information signal read from the record carrier;
a processor configured to process the parts of said video signal and the parts of the at least one additional information signal supplied by the first buffer and the second buffer, respectively, so as to obtain at least one output signal;
wherein the reader is further configure to read scheduling information from said record carrier, the scheduling information comprising time values indicating at what time parts of the at least one additional information signal or parts of the video signal have to be read from said record carrier; and
a scheduler configured to control the reader so as to read the parts of the at least one information signal or the parts of the video signal and to supply the parts read to the first buffer and the second first buffer, respectively, in dependence on the scheduling information,
wherein parts of the at least one additional information signal or the video signal are to be read from said record carrier when a system time clock is later than a time value starting at a position indicated in a start address field included in the scheduling information.

10. The apparatus as claimed in claim 9, wherein the scheduling information is in the form of a table comprising entries, and each entry of the table comprises a first parameter indicating a start position of the part to be read, the scheduler being further configured to retrieve the first parameter for controlling the reader.

11. The apparatus as claimed in claim 10, wherein each entry further comprises a second parameter indicating an amount of data to be read, the scheduler being further configured to retrieve the second parameter for controlling the reader.

12. The apparatus as claimed in claim 9, wherein the video signal is in the form of an MPEG signal and the processor is configured to decode the MPEG signal.

13. A method of recording a video signal and at least one additional information signal on a record carrier, the at least one additional information signal being meant for being reproduced simultaneously with said video signal, the method comprising the acts of:
retrieving the video signal;
retrieving the at least one additional information signal;
dividing the video signal into a sequence of video signal parts;
dividing the at least one additional information signal into a sequence of additional information signal parts;
writing the video signal parts and the additional information signal parts by a writing device on said record carrier;
determining a moment at which a part of the video signal and a part of the additional information signal should be available in a first buffer and a second buffer, respectively, of a reproducing apparatus so as to avoid a buffer underflow when reproducing the video signal and the at least one additional information signal simultaneously;
generating scheduling information comprising time value indicating at what time the parts of the video signal and the parts of the at least one additional information signal have to be read from the record carrier by a reproducing apparatus in dependence on the moments thus determined; and
writing the scheduling information on said record carrier, wherein parts of the at least one additional information signal or the video signal are to be read from said record carrier when a system time clock is later than a time value starting at a position indicated in a start address field included in the scheduling information.

14. A method of reproducing a video signal and at least one additional information signal recorded on a record carrier, the method comprising the acts of:
   reading a video part of the video signal for supplying the video part to a first buffer,
   reading an additional part of the at least one additional information signal from said record carrier for supplying the additional part to a second buffer;
   buffering the video parts of the video signal read from the record carrier in the first buffer;
   buffering the additional parts of the at least one additional information signal read from the record carrier in the second buffer;
   processing the video parts and the additional parts from the first buffer and the second buffer, respectively, so as to obtain at least one output signal;
   reading scheduling information from said record carrier by a reader controlled by a scheduler, the scheduling information comprising a time value indicating at what time the additional part or the video part has to be read from said record carrier; and
   controlling the reading acts in dependence on the scheduling information,
   wherein, when an entry is retrieved from the scheduling information, the scheduler monitors free space in the first buffer or the second buffer corresponding to a file to be read, and wherein, as soon as a free space is larger than an amount of data to be read by the entry, the scheduler instructs the reader to read at least one of the parts of the video signal and the at least one additional information signal.

15. A non-transitory computer readable medium embodying a computer program for enabling a computer to perform the acts of:
   reading a video part of the video signal for supplying the video part to a first buffer,
   reading an additional part of the at least one additional information signal from said record carrier for supplying the additional part to a second buffer;
   buffering the video parts of the video signal read from the record carrier in the first buffer;
   buffering the additional parts of the at least one additional information signal read from the record carrier in the second buffer;
   processing the video parts and the additional parts from the first buffer and the second buffer, respectively, so as to obtain at least one output signal;
   reading scheduling information from said record carrier by a reader controlled by a scheduler, the scheduling information comprising a time value indicating at what time the additional part or the video part has to be read from said record carrier; and
   controlling the reading acts in dependence on the scheduling information,
   wherein, when an entry is retrieved from the scheduling information, the scheduler monitors free space in the first buffer or the second buffer corresponding to a file to be read, and wherein, as soon as a free space is larger than an amount of data to be read by the entry, the scheduler instructs the reader to read at least one of the parts of the video signal and the at least one additional information signal.

16. The record carrier of claim 1, wherein the time values are derived from the system time clock.

17. The record carrier of claim 16, wherein amount of the at least one additional information signal or the video signal to be read is indicated in an amount field included in the scheduling information.

18. The apparatus of claim 9, wherein the time values are derived from the system time clock.

19. The apparatus of claim 18, wherein amount of the at least one additional information signal or the video signal to be read is indicated in an amount field included in the scheduling information.

20. An apparatus for reproducing a video signal and at least one additional information signal recorded on a record carrier, the apparatus comprising:
   a reader configure to read parts of the video signal and the at least one additional information signal from said record carrier for supplying the video signal to a first buffer and the at least one additional information signal to a second buffer;
   the first buffer being configured to buffer the parts of the video signal read from the record carrier;
   the second buffer being configured to buffer the parts of the at least one additional information signal read from the record carrier;
   a processor configured to process the parts of said video signal and the parts of the at least one additional information signal supplied by the first buffer and the second buffer, respectively, so as to obtain at least one output signal;
   wherein the reader is further configure to read scheduling information from said record carrier, the scheduling information comprising time values indicating at what time parts of the at least one additional information signal or parts of the video signal have to be read from said record carrier; and
   a scheduler configured to control the reader so as to read the parts of the at least one information signal or the parts of the video signal and to supply the parts read to the first buffer and the second first buffer, respectively, in dependence on the scheduling information,
   wherein, when an entry is retrieved from the scheduling information, the scheduler is further configured to monitor free space in the first buffer or the second buffer corresponding to a file to be read, and wherein, as soon as a free space is larger than an amount of data to be read by the entry, the scheduler being further configured to instruct the reader to read at least one of the parts of the video signal and the at least one additional information signal.

* * * * *